United States Patent
Matsuoka et al.

(10) Patent No.: US 8,881,359 B2
(45) Date of Patent: Nov. 11, 2014

(54) MACHINE TOOL ASSEMBLING APPARATUS AND METHOD OF ASSEMBLING MACHINE TOOL USING MACHINE TOOL ASSEMBLING APPARATUS

(75) Inventors: Ryosuke Matsuoka, Mooka (JP); Jun Sugikawa, Utsunomiya (JP); Masashi Yamaguchi, Utsunomiya (JP); Takaki Nakajima, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 404 days.

(21) Appl. No.: 13/289,522

(22) Filed: Nov. 4, 2011

(65) Prior Publication Data

US 2012/0117779 A1    May 17, 2012

(30) Foreign Application Priority Data

Nov. 11, 2010  (JP) ................................ 2010-252525

(51) Int. Cl.
*B23P 19/04*    (2006.01)
(52) U.S. Cl.
CPC ..................................... *B23P 19/04* (2013.01)
USPC ........... 29/281.6; 29/281.1; 29/281.5; 269/55
(58) Field of Classification Search
CPC .... B23P 19/001; B23P 19/002; B23P 19/006; B23P 19/007; B23P 19/04
USPC ................. 269/136, 37, 43, 45, 55; 29/281.1, 29/281.3, 281.5, 281.6
See application file for complete search history.

(56) References Cited

U.S. PATENT DOCUMENTS

| | | | | |
|---|---|---|---|---|
| 3,507,030 A * | 4/1970 | Kelly | ............................... | 29/809 |
| 3,888,362 A * | 6/1975 | Fletcher et al. | ............... | 414/620 |
| 4,568,070 A * | 2/1986 | Severt | ............................. | 269/60 |
| 4,653,739 A * | 3/1987 | Moore | ............................ | 269/61 |
| 4,779,336 A * | 10/1988 | Inoue et al. | ..................... | 29/799 |
| 4,989,444 A * | 2/1991 | Murakami et al. | .............. | 72/422 |
| 5,199,156 A * | 4/1993 | Rossi | ............................... | 29/509 |
| 5,520,502 A * | 5/1996 | Liljengren et al. | .......... | 414/751.1 |
| 5,555,763 A * | 9/1996 | Takeshita | ........................ | 72/420 |
| 6,193,142 B1 * | 2/2001 | Segawa et al. | ................ | 219/148 |
| 6,305,678 B1 * | 10/2001 | Hammersmith et al. | ........ | 269/71 |
| 6,339,874 B2 * | 1/2002 | Segawa et al. | .................. | 29/824 |
| 2004/0134756 A1 * | 7/2004 | Nishizawa et al. | ........ | 198/465.2 |

FOREIGN PATENT DOCUMENTS

| | | | |
|---|---|---|---|
| JP | 61-046782 A | | 3/1986 |
| JP | 61046782 A | * | 3/1986 |
| JP | 10-337633 A | | 12/1998 |

* cited by examiner

*Primary Examiner* — Lee D Wilson
*Assistant Examiner* — Tyrone V Hall, Jr.
(74) *Attorney, Agent, or Firm* — Carrier Blackman & Associates, P.C.; William D. Blackman; Joseph P. Carrier

(57) ABSTRACT

A machine tool assembling apparatus and a method of assembling a machine tool using the machine tool assembling apparatus are provided. The machine tool assembling apparatus includes a table, a first support mechanism having an arm which is swingable toward and away from the table, and a second support mechanism. The first support mechanism is disposed between the table and the second support mechanism. The first support mechanism is rotated to bring the arm into facing relation to either the table or the second support mechanism.

4 Claims, 17 Drawing Sheets

MACHINE TOOL ASSEMBLING APPARATUS AND METHOD OF ASSEMBLING MACHINE TOOL USING MACHINE TOOL ASSEMBLING APPARATUS

CROSS-REFERENCE TO RELATED APPLICATION

This application is based upon and claims the benefit of priority from Japanese Patent Application No. 2010-252525 filed on Nov. 11, 2010, of which the contents are incorporated herein by reference.

BACKGROUND OF THE INVENTION

1. Field of the Invention

The present invention relates to a machine tool assembling apparatus for assembling a machine tool by combining a plurality of parts, and a method of assembling a machine tool using such a machine tool assembling apparatus.

2. Description of the Related Art

Generally, machine tools are constructed by combining a plurality of parts. For example, some gang heads (see Japanese Laid-Open Patent Publication No. 10-337633) are constructed of three major parts including a first gear case, a second gear case, and a front panel. It is customary in the art to join the first gear case and the second gear case in a stacked fashion in a first station, deliver the first gear case and the second gear case to a second station, and thereafter join the front panel to the second gear case in a stacked fashion.

Specifically, in the first station, the first gear case is placed on the second gear case, and then the first gear case and the second gear case are joined to each other. At this time, the second gear case is positioned lower than the first gear case.

Before the assembly of the first gear case and the second gear case delivered from the first station reach the second station, the assembly of the first gear case and the second gear case is turned upside down in an inverting station disposed between the first station and the second station.

In the second station, the front panel is placed on the second gear case, and the front panel and the second gear case are joined to each other.

The assembly is delivered from the first station via the inverting station to the second station by a conveying means such as a roller conveyor or the like.

As described above, the assembly line for assembling gang heads includes an inverting mechanism for turning the assembly upside down in the inverting station and the conveying means for conveying the assembly between the stations. Consequently, the overall assembling system is large and complex, and needs a large installation space. Further, it is not easy to reduce the number of workers attending to the assembling process at each of the stations.

SUMMARY OF THE INVENTION

It is a general object of the present invention to provide a machine tool assembling apparatus which is simple in structure.

A main object of the present invention is to provide a machine tool assembling apparatus which needs a reduced installation space.

Another object of the present invention is to provide a machine tool assembling apparatus which can operate at a reduced operating cost.

Still another object of the present invention is to provide a method of assembling a machine tool easily and at a low cost.

According to an embodiment of the present invention, there is provided a machine tool assembling apparatus for assembling a machine tool by combining a plurality of parts, comprising a table for placing a first part thereon, a first support mechanism having an arm for supporting the first part, a swinging mechanism for swinging the arm toward and away from the table, a rotating mechanism for rotating the first support mechanism, a second support mechanism for supporting a second part, and a guide member for guiding at least one of the first support mechanism and the second support mechanism to move the first support mechanism and the second support mechanism relatively toward and away from each other, wherein the first support mechanism is positioned between the table and the second support mechanism, and when the first support mechanism is rotated by the rotating mechanism, the arm faces either one of the table and the second support mechanism.

The machine tool assembling apparatus operates as follows: After the arm is brought into a horizontal attitude and the first part on the table is installed on the arm, the arm is swung into an erected position. After the first support mechanism is rotated, the first support mechanism and the second support mechanism are relatively moved toward each other to bring the second part supported on the second support mechanism into abutment against the first part. Thereafter, all parts are combined into a machine tool.

According to the present invention, unlike the assembly line according to the related art, there is no need to have a plurality of working stations such as a first station for assembling a first gear case and a second gear case together, a second station for installing a front panel on the assembly of the first gear case and the second gear case, an inverting station, etc. Consequently, it is also not required to have a conveying means for conveying the assembly between such stations. For the reasons described above, the machine tool assembling apparatus is simple in structure, and an installation space for placing the machine tool assembling apparatus therein or a working space in which the machine tool assembling apparatus is operated is greatly reduced.

Since the machine tool assembling apparatus can be operated by a few operators at most, the total number of operators required to operate the machine tool assembling apparatus is much smaller than if operators are assigned to respective stations.

The first support mechanism may be rotated, the arm may be swung, and the first support mechanism and the second support mechanism may be relatively moved toward and away from each other by manual operation of the operator, rather than by electrically operated actuators. The machine tool assembling apparatus can thus be operated without the need for electric power supplies. Therefore, the machine tool assembling apparatus can be operated to assemble machine tools in a place which has no access to electric power supplies. The machine tool assembling apparatus can thus be operated at a reduced cost.

The machine tool assembling apparatus should preferably further include a lifting/lowering mechanism for lifting and lowering the first support mechanism. If a third part is to be installed on the first part supported on the arm, then the first support mechanism can be lifted by the lifting/lowering mechanism by a distance depending on the thickness of the third part. Therefore, the arm can be brought into a horizontal position to place the first part on the third part such that a lower end face of the first part is in abutment against an upper end face of the third part.

For the reasons described above, the lifting/lowering mechanism also should be operated by manual operation of the operator, rather than by electrically operated actuators.

The machine tool assembling apparatus should preferably further include a rotating mechanism, different from the rotating mechanism, for rotating the second support mechanism. If the second support mechanism cannot be rotated, then the second part needs to be supported on a side of the second support mechanism that faces the first support mechanism. However, such a process of supporting the second part is not easy to perform. According to the present embodiment, since the second support mechanism is rotatable, after the second part is supported on the second support mechanism, the second support mechanism can be rotated to bring the second part supported thereby into facing relation to the first support mechanism. The process of supporting the second part on the second support mechanism can be carried out quickly.

The second support mechanism should preferably be rotated by manual operation of the operator, rather than by an electrically operated actuator.

The table should preferably have insertion holes defined therein. When the first part has recesses defined therein, positioning pins should preferably be inserted into the insertion holes and also inserted into the recesses, thereby to position and secure the first part on the table. It is thus easy to install the first part in a given position on the arm.

In addition, the machine tool assembling apparatus should preferably further include a movable carriage. The movable carriage allows the machine tool assembling apparatus to move easily to a desired location where a machine tool is to be assembled by the machine tool assembling apparatus. Therefore, machine tools can be assembled by the machine tool assembling apparatus in desired assembling areas in a factory which are not limited to any particular areas. The layout of machines and apparatus in the factory is thus designed with increased freedom.

According to an embodiment of the present invention, there is also provided a method of assembling a machine tool by combining a plurality of parts, comprising the steps of supporting a first part placed on a table, with an arm of a first support mechanism which is swung toward the table, swinging the arm which has supported the first part, away from the table and then rotating the first support mechanism to bring the first part into facing relation to a second part supported on a second support mechanism, and bringing the first support mechanism and the second support mechanism relatively toward each other, to thereby assemble a machine tool including the first part and the second part.

The method is carried out as follows: After the arm is brought into a horizontal attitude and the first part on the table is installed on the arm, the arm is swung into an erected position. After the first support mechanism is rotated, the first support mechanism and the second support mechanism are relatively moved toward each other to bring the second part supported on the second support mechanism into abutment against the first part. Therefore, it is easy to assemble the first part and the second part together. Thereafter, all parts are combined into a machine tool easily.

Accordingly, there is no need to have a plurality of working stations such as a first station for assembling a first gear case and a second gear case together, a second station for installing a front panel on the assembly of the first gear case and the second gear case, an inverting station, etc. Consequently, it is also not required to have a conveying means for conveying the assembly between such stations.

Since the method can be carried out by a few operators at most, the total number of operators required to operate the machine tool assembling apparatus is much smaller than if operators are assigned to respective stations.

Inasmuch as facility investments for carrying out the method are reduced, machine tools can be assembled at a low cost.

Preferably, the second support mechanism is rotatable. In this case, after the first support mechanism supports the first part and the second support mechanism supports the second part, the first support mechanism and the second support mechanism are rotated to bring the first part and the second part into facing relation to each other. It is thus easy to combine the first part and the second part with each other.

The method may further include the steps of, after the arm which has supported the first part is swung away from the table and until the first support mechanism is rotated, placing a third part on the table, and lifting the arm which has supported the first part, swinging the arm toward the table to install the third part on the first part supported on the arm, and swinging the arm which has supported the first part and the third part, away from the table.

Through the above steps, it is possible to assemble a machine tool including the first part and the third part, and the second part which is supported by the second support mechanism.

Preferably, the second support mechanism is rotatable, and after the first support mechanism supports the first part and the third part and the second support mechanism supports the second part, the first support mechanism and the second support mechanism are rotated to bring the first part and the third part, and the second part into facing relation to each other. It is therefore easy to install the second part on the assembly of the first part and the third part.

Preferably, the first part has recesses defined therein and the table has insertion holes defined therein, and the method further includes the steps of inserting positioning pins into the insertion holes, and when the first part is placed on the table, inserting the positioning pins into the recesses to position and secure the first part on the table. As a consequence, the first part can easily be positioned and secured on the table.

All the steps can be carried out manually. As no electric energy is needed to carry out the method, the method can be carried out at a reduced cost.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A machine tool assembling apparatus according to a preferred embodiment of the present invention in relation to a method of assembling a machine tool using the machine tool assembling apparatus will be described in detail below with reference to the accompanying drawings.

Figure 1:
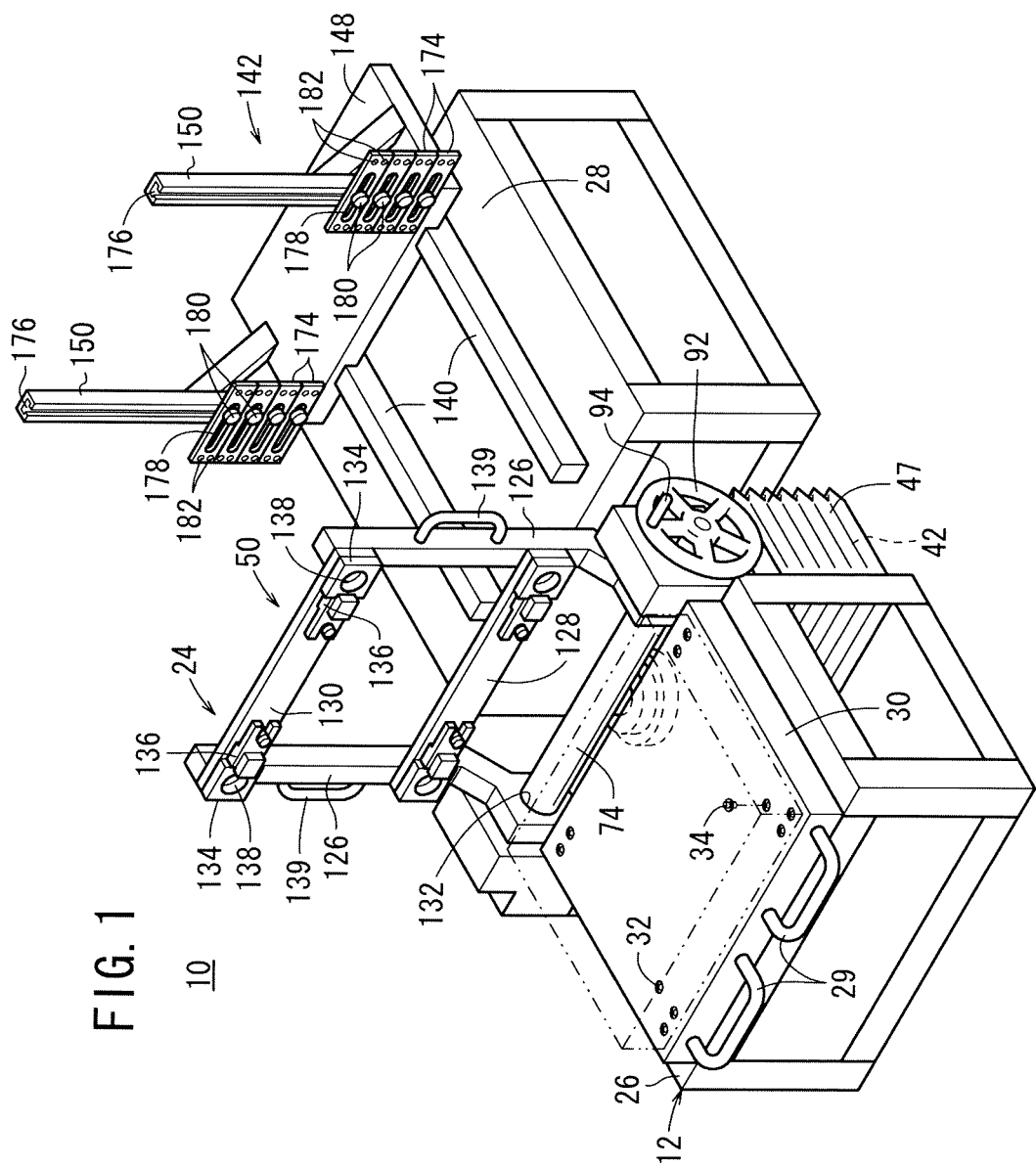
FIG. 1 is a schematic perspective view of a machine tool assembling apparatus according to an embodiment of the present invention.
Figure 2:
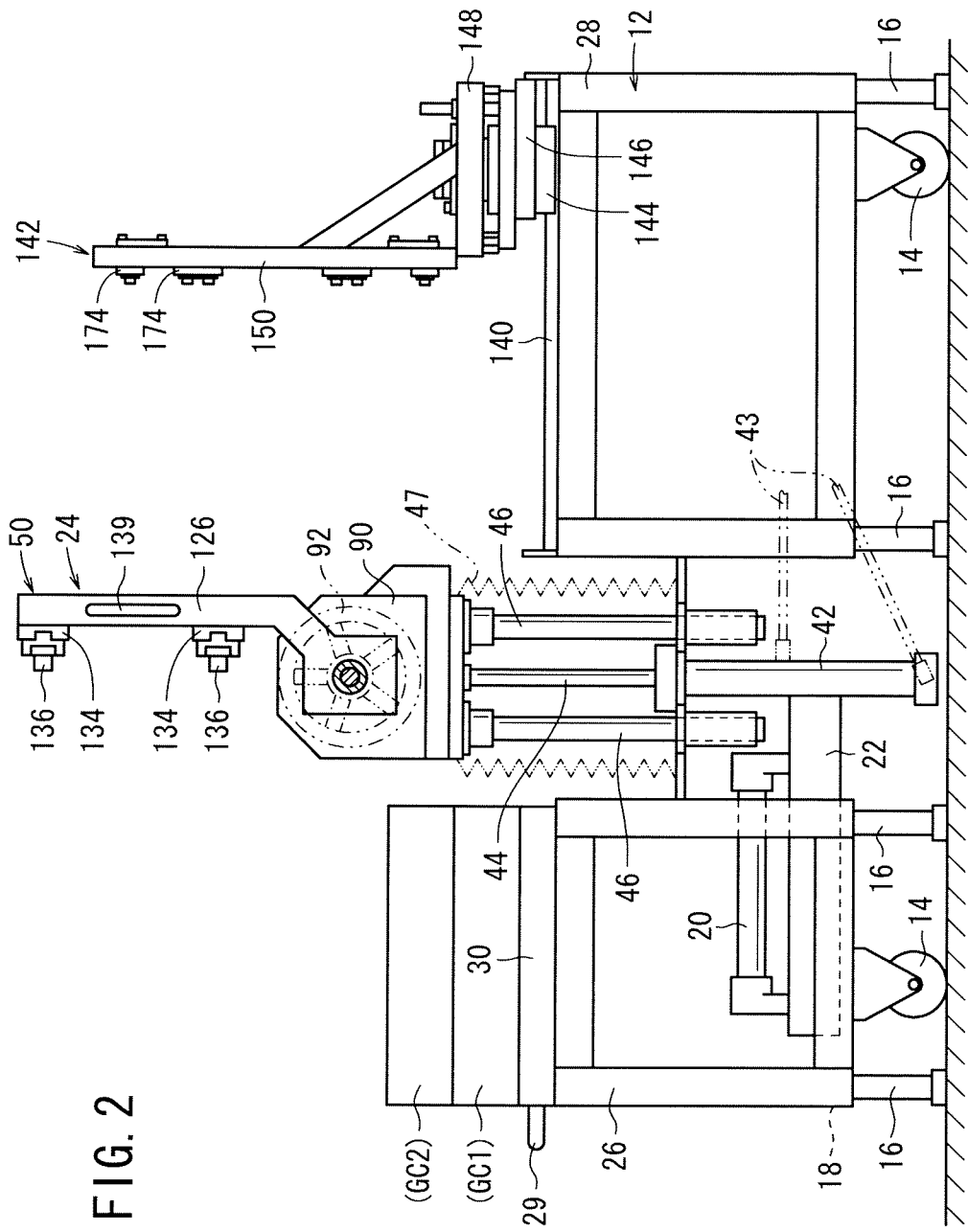
FIG. 2 is a side elevational view of the machine tool assembling apparatus shown in FIG. 1.

FIGS. 1 and 2 are a schematic perspective view and a longitudinal side elevational view, respectively, of a machine tool assembling apparatus 10 according to an embodiment of the present invention. The machine tool assembling apparatus 10 serves to assemble a gang head as a machine tool on a carriage 12 thereof.

The carriage 12, which is in the form of a frame, has a plurality of wheels 14 (see FIG. 2) which easily rotate on a floor when the carriage 12 is pushed. Therefore, the machine tool assembling apparatus 10 can easily be moved to a desired location. A plurality of stability legs 16 which can be displaced toward and away from the carriage 12 when they are threadedly turned are disposed in the vicinity of the wheels 14. When all the stability legs 16 are seated on the floor, the machine tool assembling apparatus 10 is prevented from falling over.

Stability legs 16 are also mounted on a stability frame 18 which projects from one side of the carriage 12. A hand pump support bracket 22 on which a known hand pump 20 is supported is disposed on another side of the carriage 12. As described later, when an operator operates the hand pump 20, a first support mechanism 24 is lifted or lowered. The hand pump 20 thus serves as a lifting/lowering mechanism for lifting and lowering the first support mechanism 24.

As shown in FIG. 2, the carriage 12 is of an elongate structure and includes its upper portion divided into a relatively short first section 26 and a relatively long second section 28. The operator grips handles 29 mounted on the relatively short first section 26 when the operator is to move the carriage 12 and hence the machine tool assembling apparatus 10.

Figure 3:
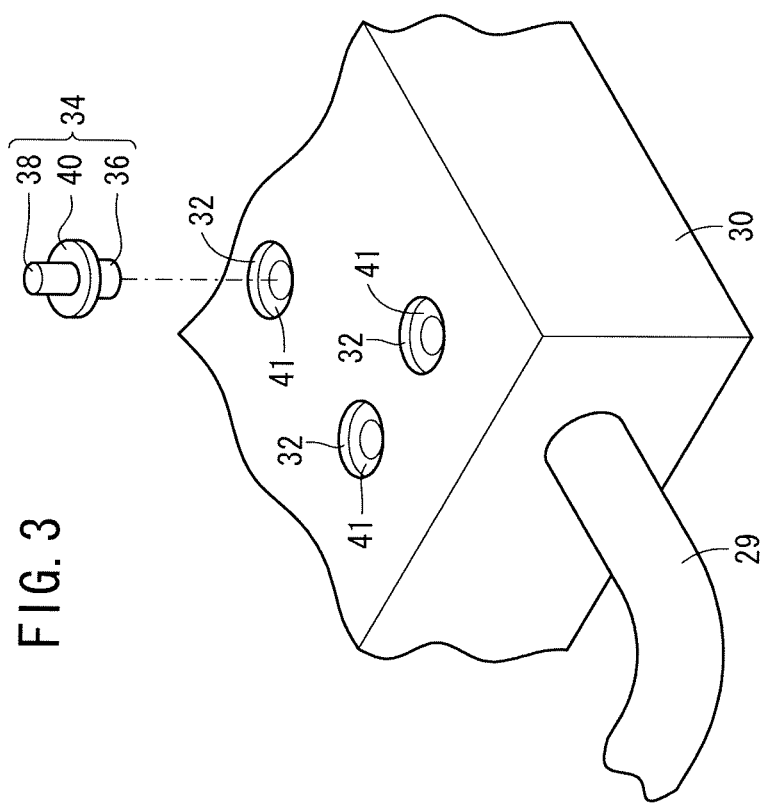
FIG. 3 is an enlarged fragmentary perspective view of a table of the machine tool assembling apparatus shown in FIG. 1.

A table 30 that is substantially in the form of a flat plate is disposed on an upper end surface of the first section 26. As shown in FIGS. 2 and 3, the table 30 has, for example, ten insertion holes 32 defined therein. Positioning pins 34 are inserted in some of the insertion holes 32.

As shown at an enlarged scale in FIG. 3, each of the positioning pins 34 has a first head 36 that is substantially in the form of a large-diameter rod, a second head 38 which is slightly smaller in diameter than the first head 36, and a disk 40 interposed between the first head 36 and the second head 38 and which is greater in diameter than the first head 36. Either the first head 36 or the second head 38 is inserted in one of the insertion holes 32, and either the second head 38 or the first head 36 is exposed from the insertion hole 32. Each of the insertion holes 32 has a step 41 therein which blocks the disk 40 to prevent the positioning pin 34 from being further inserted.

As described later, whether the first head 36 or the second head 38 should be projected from the insertion hole 32 depends on the type of part to be handled.

The first section 26 and the second section 28 of the carriage 12 are spaced from each other, as shown in FIG. 2. The first support mechanism 24 is disposed in the space between the first section 26 and the second section 28.

A hydraulic cylinder 42 as a lifting/lowering mechanism is disposed below the first support mechanism 24 and supported by the carriage 12. The hydraulic cylinder 42 has oil transmitting tubes 43 connected to the hand pump 20. The hydraulic cylinder 42 includes a vertical lifting/lowering rod 44 which is vertically movably connected to the first support mechanism 24. When the operator operates the hand pump 20 to deliver working oil under pressure into the hydraulic cylinder 42, the lifting/lowering rod 44 is extended vertically upwardly, i.e., lifted. When the operator operates the hand pump 20 to remove working oil from the hydraulic cylinder 42, the lifting/lowering rod 44 is retracted vertically downwardly, i.e., lowered. The lifting and lowering movement of the lifting/lowering rod 44 is well known in the art, and will not be described in detail below.

Four vertical linear guides 46 are disposed around the hydraulic cylinder 42 and connected to the first support mechanism 24. When the lifting/lowering rod 44 is lifted or lowered, the first support mechanism 24 is accordingly lifted or lowered while at the same time the first support mechanism 24 is guided by the linear guides 46.

The lifting/lowering rod 44 and the linear guides 46 are protected by a bellows-like cover 47 which is disposed around the lifting/lowering rod 44 and the linear guides 46.

Figure 4:
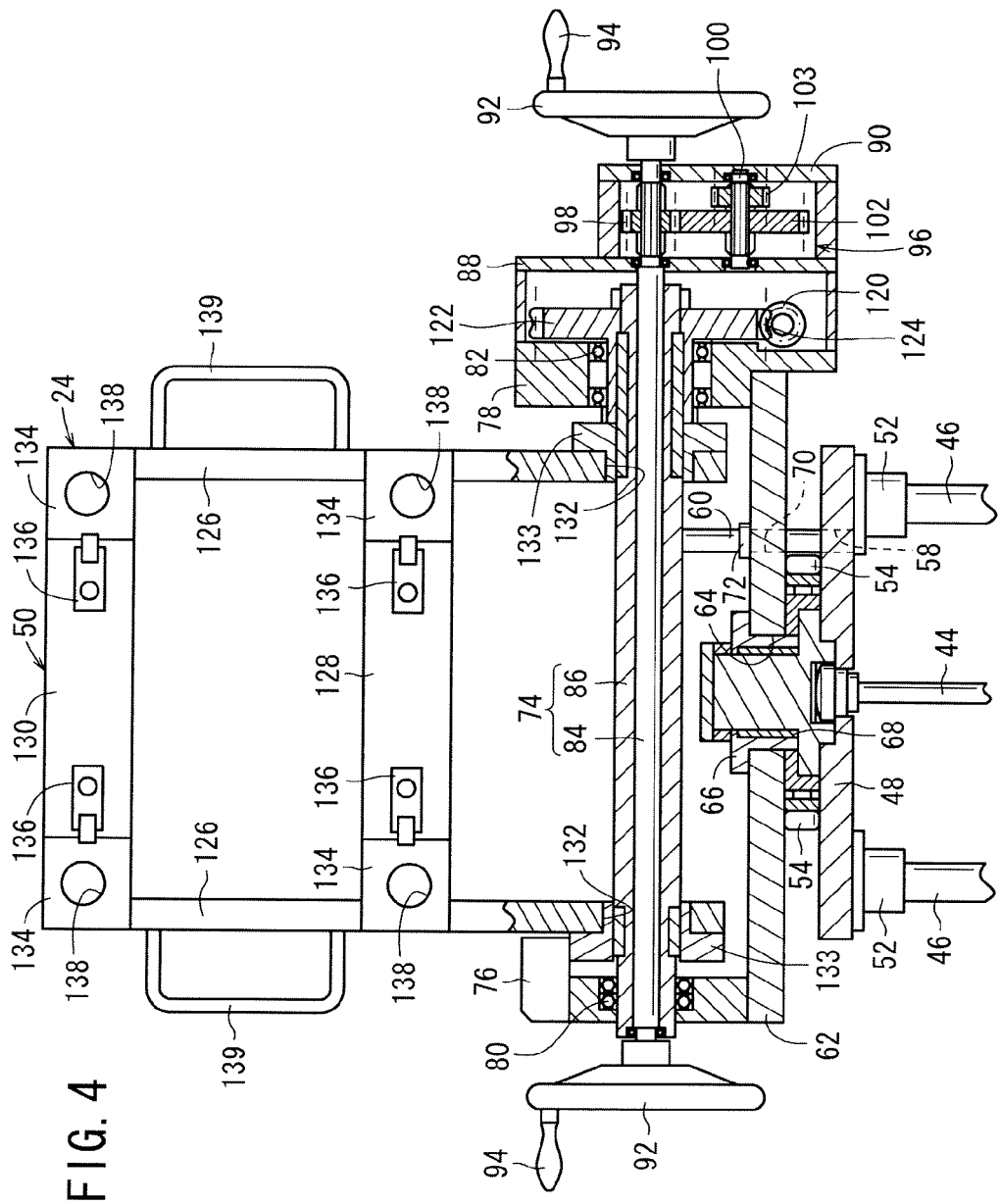
FIG. 4 is a front elevational view, partly in cross section, of a first support mechanism of the machine tool assembling apparatus.
Figure 5:
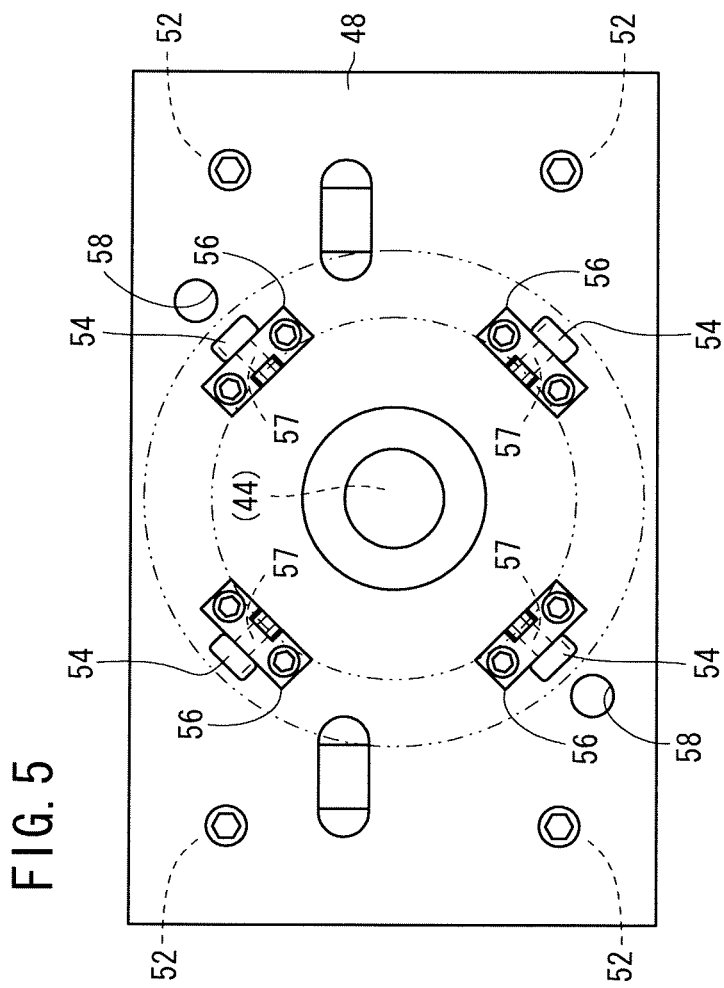
FIG. 5 is a plan view of a base plate of the first support mechanism.

As shown in FIGS. 4 and 5, the first support mechanism 24 includes a base plate 48 connected to the upper end of the lifting/lowering rod 44 and an arm 50 swingable toward and away from the table 30. Receptacles 52 which receive the upper ends of the linear guides 46 are mounted on a lower end surface of the base plate 48.

Four rollers 54 are rollingly disposed on an upper end surface of the base plate 48 in a circular pattern around the joint between the base plate 48 and the lifting/lowering rod 44. Specifically, roller fixtures 56 are fixedly arranged on the upper end surface of the base plate 48 at about 90° angular intervals. The rollers 54 are rotatably coupled to the respective roller fixtures 56 by respective rotational shafts 57. The rollers 54 assist members and mechanisms above the base plate 48 of the first support mechanism 24 in rotating with respect to the base plate 48.

The base plate 48 includes two rotation prevention holes 58 defined in an upper surface thereof. When rotation prevention pins 60 are inserted in the respective rotation prevention holes 58, they prevent the first support mechanism 24 from rotating.

As shown in FIG. 4, a rotary plate 62 with a rotating mechanism is disposed above the base plate 48. The rotary plate 62 has a through hole 64 defined substantially centrally therein. A bearing 68 of the rotating mechanism is housed in the through hole 64 with a bearing support sleeve 66 interposed between the bearing 68 and the peripheral wall surface of the through hole 64. The rotary plate 62 is rotatable about the bearing support sleeve 66.

The rotary plate 62 has a rotation prevention hole 70 defined therethrough. The rotation prevention pin 60 extends through the rotation prevention hole 70 and is inserted into the rotation prevention hole 58 formed in the upper end surface of the base plate 48. The rotation prevention pin 60 has a wide flange 72 disposed on a substantially central portion thereof and which abuts against the upper end surface of the rotary plate 62, thereby holding the rotation prevention pin 60 on the rotary plate 62.

The arm 50 is swingable about a pivot shaft 74 with respect to the rotary plate 62. Specifically, on the upper end surface of the rotary plate 62, a first support block 76 and a second support block 78 are mounted respectively on a left end and a right end, as shown in FIG. 4, of the rotary plate 62, and the pivot shaft 74 extends between and is rotatably supported on the first support block 76 and the second support block 78 by respective bearings 80, 82.

The pivot shaft 74 includes a long small-diameter shaft member 84 and a hollow cover member 86 surrounding the small-diameter shaft member 84. The small-diameter shaft member 84 has a right end portion projecting axially from the hollow cover member 86. The hollow cover member 86 has a right end portion surrounded by a first casing 88 joined to the second support block 78. The projecting right end portion of the small-diameter shaft member 84 is surrounded by a second casing 90.

Swing handles 92 are coupled to the respective opposite ends of the small-diameter shaft member 84. When the operator grips a grip bar 94 of either one of the swing handles 92 and turns the swing handle 92, the small-diameter shaft member 84 is turned about its own axis, and the turning motion thereof is transmitted through a gearbox 96 to the pivot shaft 74. The gearbox 96 and the pivot shaft 74 jointly make up a swing mechanism for swinging the arm 50.

Specifically, a first gear 98 is fitted over a portion of the small-diameter shaft member 84 that is enclosed in the second casing 90. The first gear 98 is held in mesh with a large-diameter second gear 102 fitted over a first rotational shaft 100 which is rotatably supported on the first casing 88 and the second casing 90. A small-diameter third gear 103 is also fitted over the first rotational shaft 100.

Figure 6:
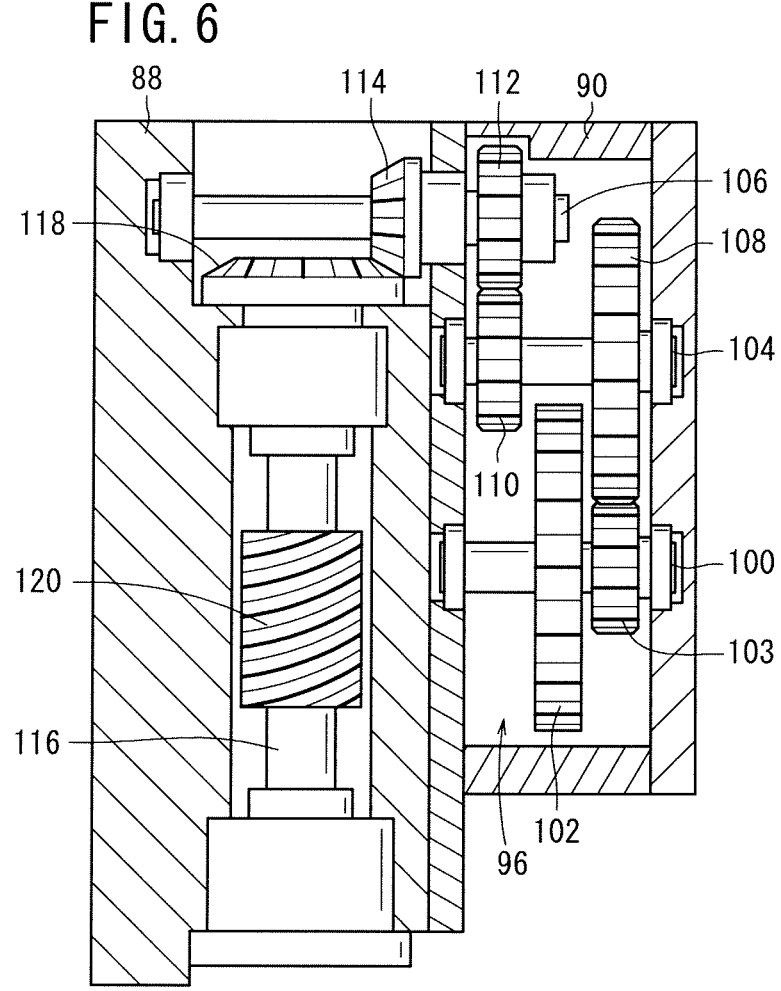
FIG. 6 is a plan view of a gearbox of the first support mechanism.

As shown in FIG. 6, the gearbox 96 includes a second rotational shaft 104 and a third rotational shaft 106 which are housed in the second casing 90. The gearbox 96 also includes a large-diameter fourth gear 108 and a small-diameter fifth gear 110 which are fitted over the second rotational shaft 104, and a large-diameter sixth gear 112 and a first bevel gear 114 which are fitted over the third rotational shaft 106.

A fourth rotational shaft 116 is rotatably housed in the first casing 88. A second bevel gear 118 and a cylindrical worm 120 are fitted over the fourth rotational shaft 116.

The third gear 103 is held in mesh with the fourth gear 108, and the fifth gear 110 is held in mesh with the sixth gear 112. The first bevel gear 114 is held in mesh with the second bevel gear 118. The cylindrical worm 120 is held in mesh with a worm wheel 124 formed on a side circumferential wall of a large-diameter flange 122 positioned at an end of the hollow cover member 86.

The arm 50 includes two L-shaped blocks 126 which are substantially L-shaped as viewed in side elevation when they are erected away from the table 30, and a first bridge member 128 and a second bridge member 130 which are mounted on and extend between the L-shaped blocks 126.

The L-shaped blocks 126 have U-shaped grooves 132 (see FIG. 1) defined respectively in proximal ends thereof. The hollow cover member 86 is fitted in the U-shaped grooves 132. The proximal ends of the L-shaped blocks 126 are secured by bolts to respective joint flanges 133 of the hollow cover member 86, thereby joining the arm 50 to the pivot shaft 74.

When the operator turns one of the swing handles 92, thereby turning the small-diameter shaft member 84, the turning motion thereof is transmitted through the gearbox 96 which includes the first gear 98 (see FIG. 4), the second gear 102 (see FIG. 6), the third gear 103, the fourth gear 108, the fifth gear 110, the sixth gear 112, the first bevel gear 114, the second bevel gear 118, the cylindrical worm 120, and the worm wheel 124. Finally, the hollow cover member 86 is turned about its own axis to swing the arm 50 toward or away from the table 30 about the hollow cover member 86.

A receiver block member 134 and a known clamp arm 136 are mounted on each of the end portions of the first bridge member 128 and the second bridge member 130 which are close to the arm 50. The receiver block member 134 has a bottomed recess 138 defined therein for receiving a protrusion of a part placed on the table 30. When the clamp arm 136 is closed, the part is supported on the arm 50.

The arm 50 has a pair of grips 139 mounted respectively on outer sides of the L-shaped blocks 126. The grips 139 are gripped by the operator when the first support mechanism 24 is turned.

Two parallel guide rails 140 as guide members are disposed on an upper end face of the second section 28 of the carriage 12 (see FIGS. 1 and 2). The second support mechanism 142 is slidably mounted on the guide rails 140. The second support mechanism 142 can be displaced toward and away from the first support mechanism 24 along the guide rails 140.

As will be understood from the above, the first support mechanism 24 is disposed between the table 30 and the second support mechanism 142.

Figure 7:
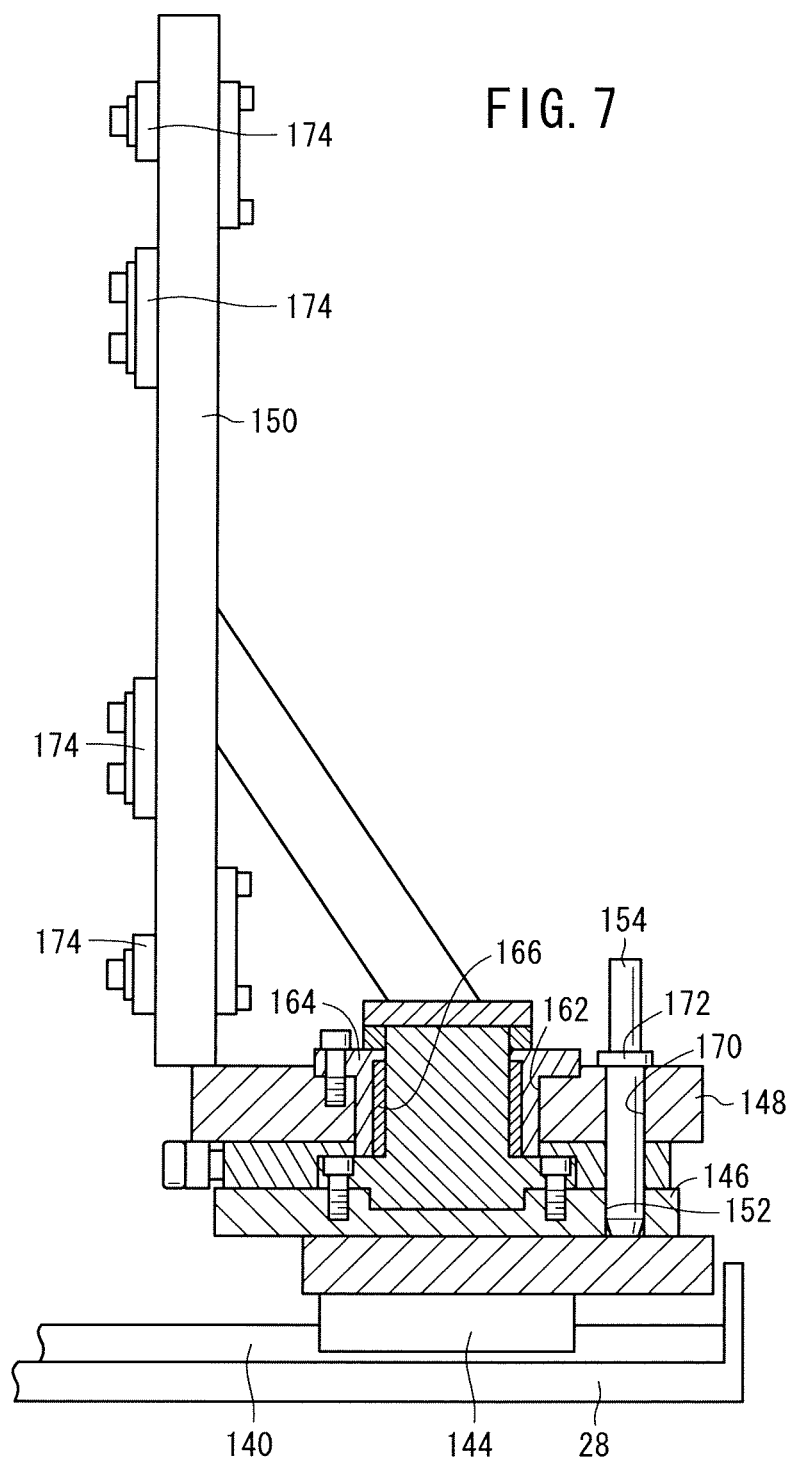
FIG. 7 is a side elevational view, partly in cross section, of a second support mechanism of the machine tool assembling apparatus.
Figure 8:
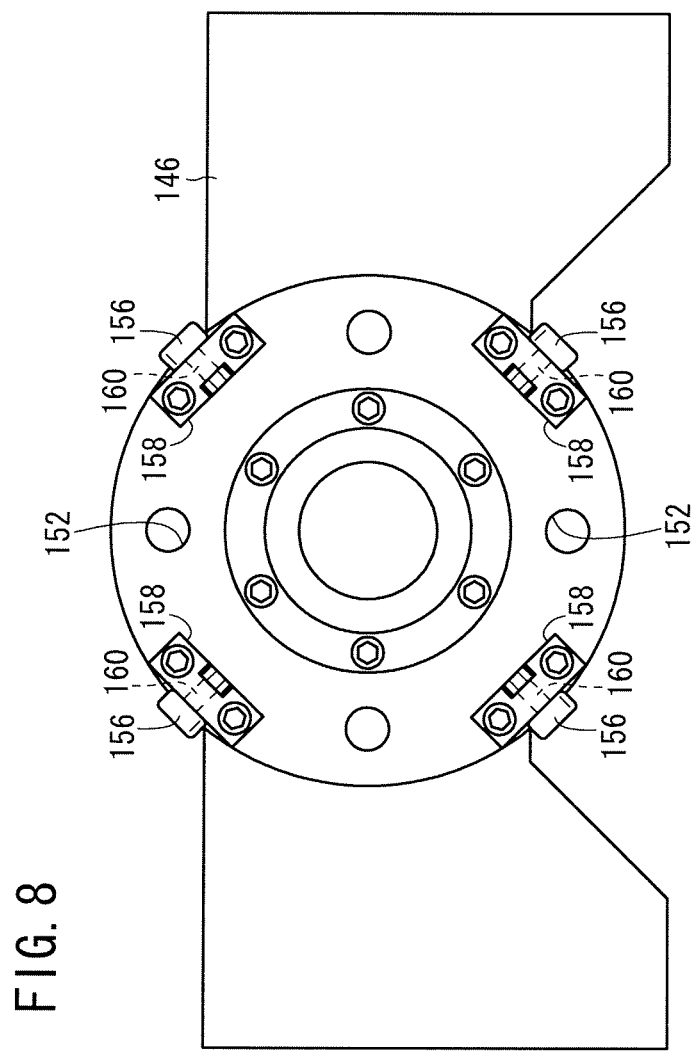
FIG. 8 is a plan view of a base plate of the second support mechanism.

As shown in FIGS. 7 and 8, the second support mechanism 142 includes a base plate 146 with sliders 144 on its lower end face, a rotary plate 148 rotatable with respect to the base plate 146, and two columnar support members 150 vertically mounted on the rotary plate 148.

The sliders 144 are held in slidable engagement with the guide rails 140, respectively. The second support mechanism 142 slides along the guide rails 140 when it is pushed or pulled by the operator.

The base plate 146 includes two rotation prevention holes 152 defined in an upper surface thereof. A rotation prevention pin 154 is inserted into the rotation prevention hole 152.

Four rollers 156 are rollingly disposed on an upper end surface of the base plate 146 in a circular pattern substantially around the center of the base plate 146 (see FIG. 8). Specifically, roller fixtures 158 are fixedly arranged on the upper end surface of the base plate 146 at about 90° angular intervals. The rollers 156 are rotatably coupled to the respective roller fixtures 158 by respective rotational shafts 160. The rollers 156 assist the rotary plate 148 and hence the columnar support members 150 in rotating with respect to the base plate 146.

The rotary plate 148 which is disposed above the base plate 146 has a through hole 162 defined centrally therein. A bearing 166 of a rotating mechanism is housed in the through hole 162 with a bearing support sleeve 164 interposed between the bearing 166 and the peripheral wall surface of the through hole 162. The rotary plate 148 is rotatable about the bearing support sleeve 164.

The rotary plate 148 has a rotation prevention hole 170 defined therethrough. The rotation prevention pin 154 is inserted through the rotation prevention hole 170 and further inserted into the rotation prevention hole 152 formed in the upper end surface of the base plate 146, thereby preventing the rotary plate 148 and the columnar support members 150 of the second support mechanism 142 from rotating. The rotation prevention pin 154 has a wide flange 172 disposed on a substantially central portion thereof and which abuts against the upper end surface of the rotary plate 148, thereby holding the rotation prevention pin 154 on the rotary plate 148.

As shown in FIG. 1, a plurality of support angles 174 are positionally adjustably mounted on each of the columnar support members 150. The support angles 174 have their longitudinal axes extending perpendicularly to the longitudinal axis of the columnar support member 150. The columnar support member 150 has a positioning groove 176 defined therein and which extends along the longitudinal axis thereof. The positioning groove 176 is open at a longitudinal end face of the columnar support member 150. Each of the support angles 174 has an oblong hole 178 defined therethrough. When a bolt 180 is inserted through the oblong hole 178 and reaches the positioning groove 176 and a nut, not shown, is threaded and tightened over the bolt 180, each of the support angles 174 is positioned and fixed to the columnar support member 150. The opening of the positioning groove 176 is smaller in size than the nuts, thereby preventing the nut from accidentally falling off from the positioning groove 176.

The second support mechanism 142 can support parts of various sizes by changing the positions of the support angles 174. Each of the support angles 174 has a plurality of insertion holes 182 defined therethrough for passing joint members such as bolts, pins, etc. therethrough.

The machine tool assembling apparatus 10 according to the present embodiment is basically constructed as described above. Operation and advantages of the machine tool assembling apparatus 10 in relation to a method of assembling a machine tool according to the present embodiment will be described below with reference to the accompanying drawings. In the following description, the machine tool assembling apparatus 10 will be used to assemble a gang head of major parts including a first gear case (first part), a front panel (second part), and a second gear case (third part). For an easier understanding of the present invention, the machine tool assembling apparatus 10 and the parts are briefly illustrated in FIGS. 9 through 17.

For assembling a gang head, the operator pushes the carriage 12 to move the machine tool assembling apparatus 10 to an assembling location. After having moved the machine tool assembling apparatus 10 to the assembling location, the operator pulls the stability legs 16 downwardly and hold them against the floor to prevent the machine tool assembling apparatus 10 from falling over.

Figure 9:
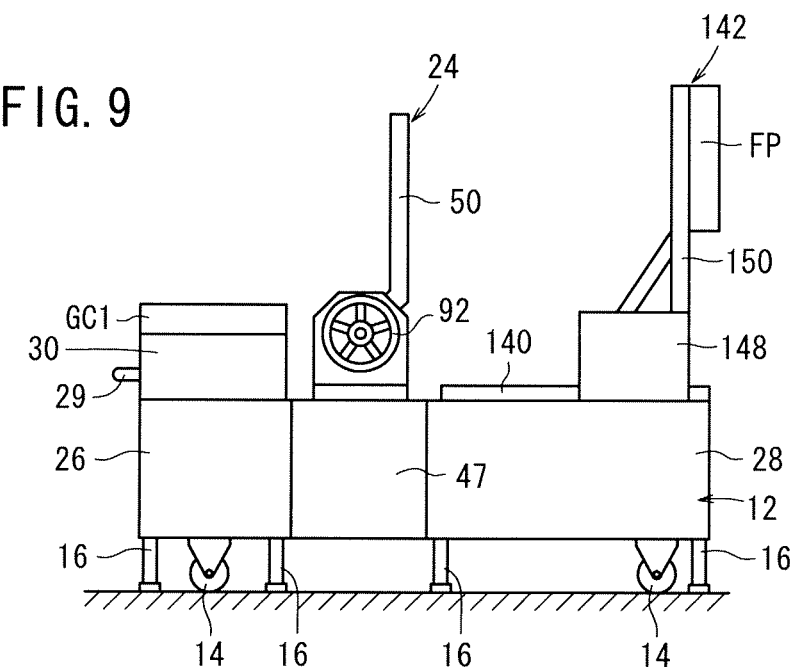
FIG. 9 is a schematic side elevational view showing the manner in which a first gear case as a first part is placed on the table and a front panel as a second part is supported by the second support mechanism.

Then, as shown in FIG. 9, the operator places a first gear case GC1 on the table 30. At this time, either the first heads 36 or the second heads 38 of the positioning pins 34 are inserted into recesses defined in a lower end face of the first gear case GC1, thereby positioning and securing the first gear case GC1 on the table 30. The insertion holes 32 in which to insert the positioning pins 34 and the first heads 36 or the second heads 38 of the positioning pins 34 are appropriately selected depending on the dimensions of the recesses defined in the lower end face of the first gear case GC1.

At this time, the rotation prevention pins 60, 154 are inserted through the rotation prevention holes 70, 170 into the rotation prevention holes 58, 152 to prevent the first support mechanism 24 and the second support mechanism 142 from rotating.

Also, the first support mechanism 24 is positioned in a lowest position. The arm 50 is in an erected position with the receiver block members 134 and the clamp arms 136 facing the table 30 side. The second support mechanism 142 is retracted to a position at the rear ends of the guide rails 140, i.e., a position farthest from the first support mechanism 24.

The operator then installs a front panel FP onto the support angles 174 of the second support mechanism 142. The support angles 174 are appropriately adjusted in position depending on the dimensions of the front panel FP and secured onto the columnar support members 150 by the bolts 180 and the nuts.

For installing the front panel FP on the support angles 174, joint members such as bolts, pins, etc., for example, are inserted through the insertion holes 182 defined in the support angles 174 and into recesses defined in an end face of the front panel FP. The insertion holes 182 that correspond to the positions of the recesses are selected from all the insertion holes 182 in the support angles 174.

Figure 10:
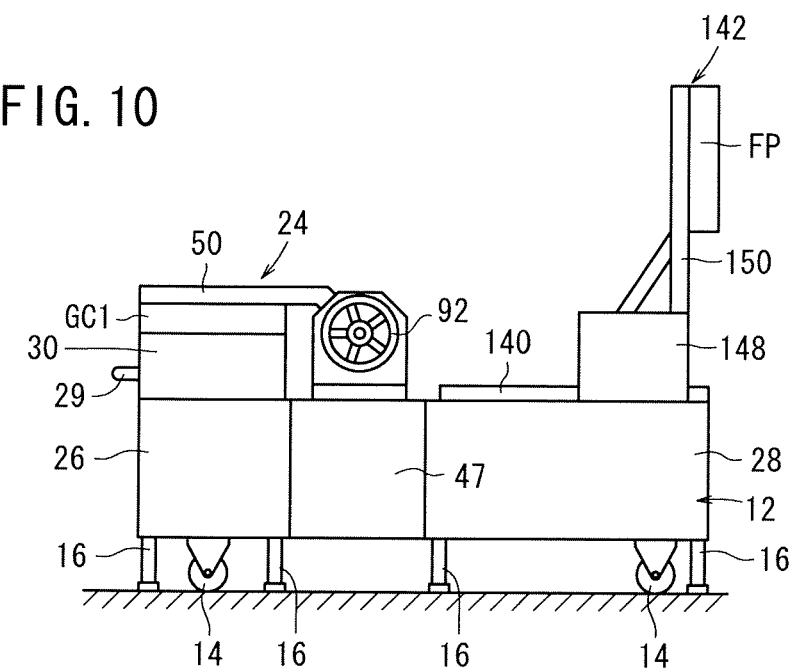
FIG. 10 is a schematic side elevational view showing the manner in which an arm member of the first support mechanism is displaced closely to the table and supports the first gear case.

Then, the operator grips the grip bar 94 of one of the swing handles 92 and turns the swing handle 92. The turning motion of the swing handle 92 is transmitted successively through the first gear 98, the second gear 102, the third gear 103, the fourth gear 108, the fifth gear 110, the sixth gear 112, the first bevel gear 114, the second bevel gear 118, the cylindrical worm 120, and the worm wheel 124 of the gearbox 96 (see FIG. 6). As a result, the hollow cover member 86 is turned about its own axis to swing the arm 50 toward the table 30, as shown in FIG. 10.

Protrusions on an upper end face of the first gear case GC1 now enter the bottomed recesses 138 of the receiver block members 134 on the arm 50. Thereafter, the clamp arms 136 are closed to install the first gear case GC1 on the arm 50.

Figure 11:
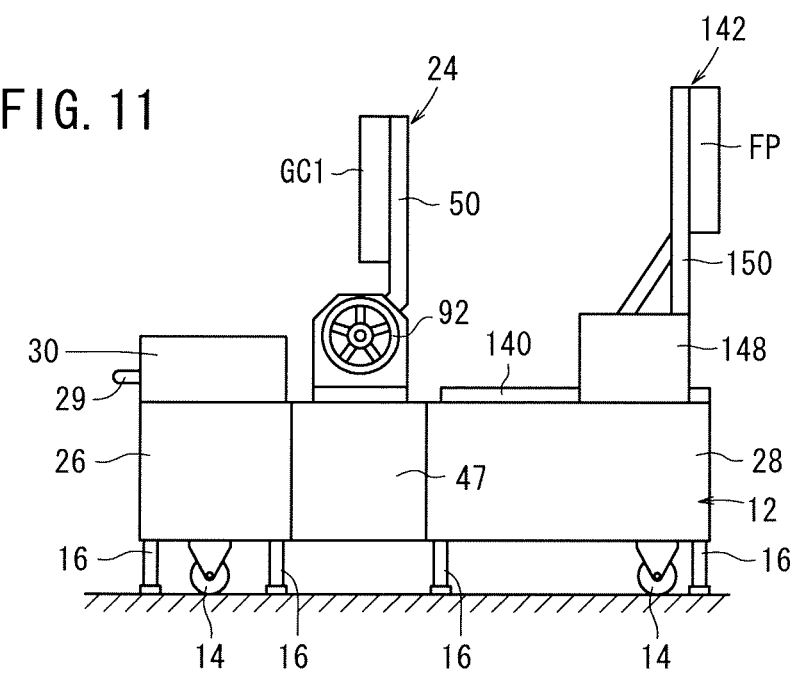
FIG. 11 is a schematic side elevational view showing the manner in which after the state shown in FIG. 10, the arm member is displaced away from the table to lift the first gear case, and a second gear case as a third part is placed on the table.

Then, the operator turns the swing handle 92 in the opposite direction. The pivot shaft 74 is turned to swing the arm 50 away from the table 30, as shown in FIG. 11. The first gear case GC1 which is installed on the arm 50 is lifted away from the table 30.

Figure 12:
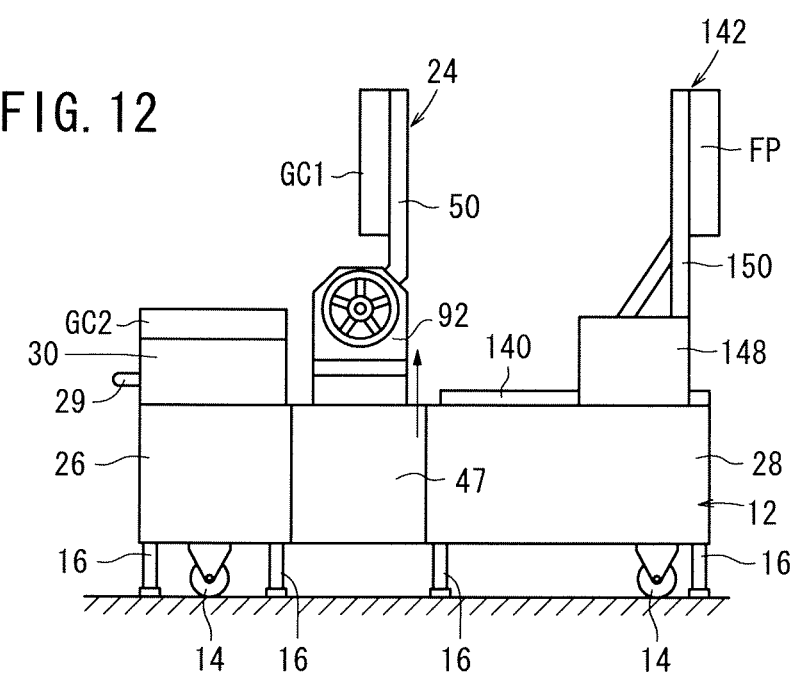
FIG. 12 is a schematic side elevational view showing the manner in which after the state shown in FIG. 11, the first support mechanism is elevated.

Then, the operator places a second gear case GC2. The operator operates the hand pump 20 to lift the lifting/lowering rod 44 of the hydraulic cylinder 42, thereby elevating the first support mechanism 24, as shown in FIG. 12. At this time, the linear guides 46 guide the first support mechanism 24 for its upward movement. The distance that the first support mechanism 24 is upwardly displaced approximately coincides with the thickness of the second gear case GC2.

Figure 13:
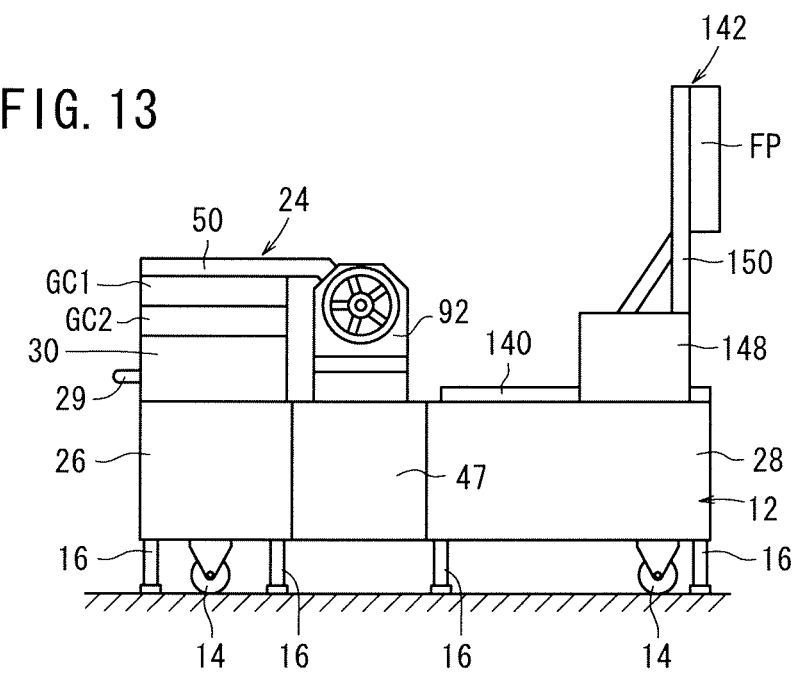
FIG. 13 is a schematic side elevational view showing the manner in which after the state shown in FIG. 12, the arm member is displaced closely to the table to bring the first gear case supported by the arm member into abutment against the second gear case.

Then, the operator operates one of the swing handles 92 to swing the arm 50 toward the table 30. As shown in FIG. 13, the first gear case GC1 is placed on the second gear case GC2. The operator joins the first gear case GC1 and the second gear case GC2 to each other with bolts or the like, for example.

Figure 14:
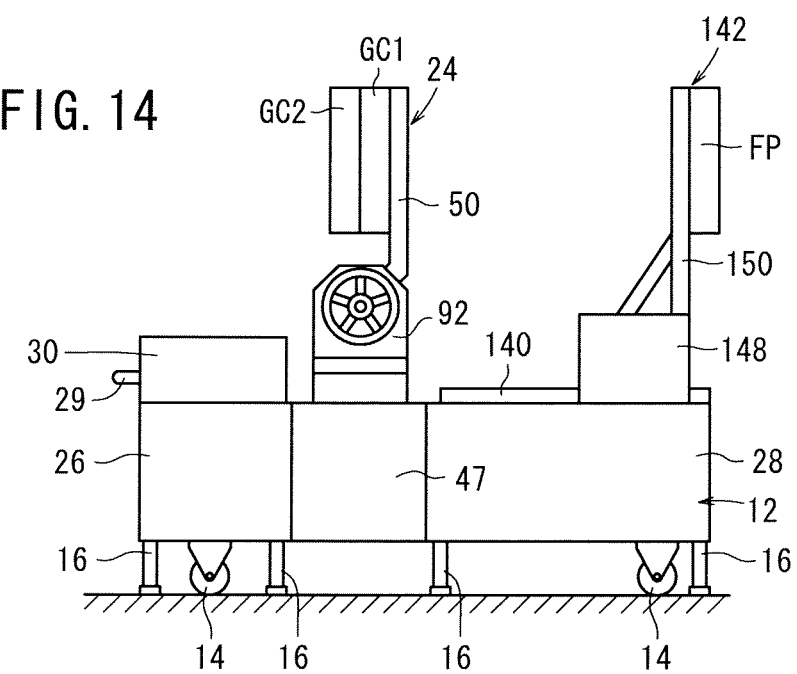
FIG. 14 is a schematic side elevational view showing the manner in which after the state shown in FIG. 13, the arm member is displaced away from the table to lift the assembly of the first gear case and the second gear case.

Then, the operator operates the swing handle 92 to swing the arm 50 away from the table 30. As shown in FIG. 14, the assembly of the first gear case GC1 and the second gear case GC2 is lifted by the arm 50.

Then, the operator removes the rotation prevention pins 60, 154 from the rotation prevention holes 58, 152 and the rotation prevention holes 70, 170, and thereafter turns portions of the first support mechanism 24 and the second support mechanism 142 that are above the rotary plates 62, 148, through about 180°. The turning movement of the first support mechanism 24 and the second support mechanism 142 is allowed by the bearings 68, 166 and assisted by the rollers 54, 156.

Figure 15:
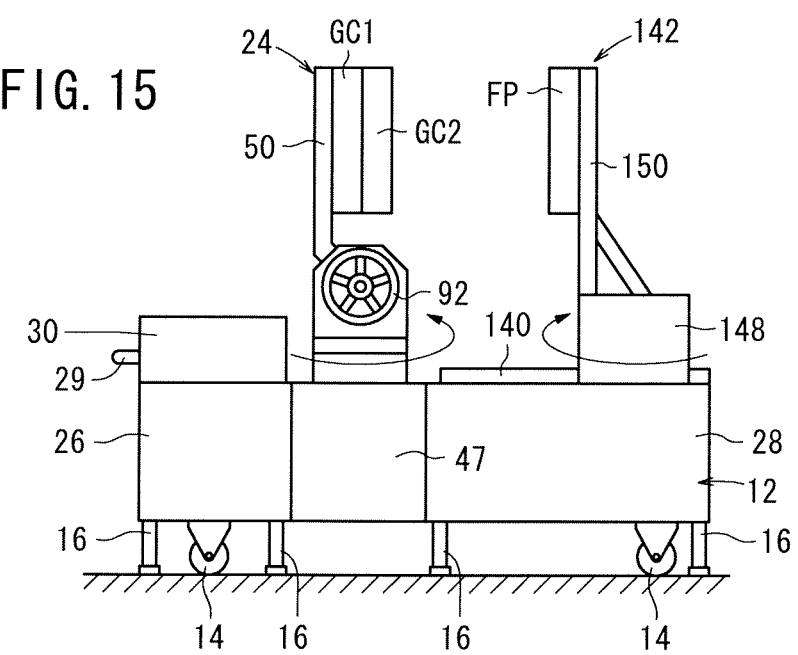
FIG. 15 is a schematic side elevational view showing the manner in which after the state shown in FIG. 14, the arm member and the second support mechanism are inverted to cause the assembly and the front panel to face each other.

The arm 50 which has faced the table 30 side is now turned around to face the second support mechanism 142. As a result, as shown in FIG. 15, the assembly of the first gear case GC1 and the second gear case GC2 on the first support mechanism 24 and the front panel FP on the second support mechanism 142 face each other such that the second gear case GC2 faces the front panel FP.

Thereafter, the operator inserts the rotation prevention pins 60, 154 through the rotation prevention holes 70, 170 into the rotation prevention holes 58, 152. The first support mechanism 24 and the second support mechanism 142 are now prevented again from rotating.

Then, the operator pushes the second support mechanism 142 toward the first support mechanism 24. At this time, the sliders 144 of the second support mechanism 142 slide along the guide rails 140 to move the second support mechanism 142 along the guide rails 140 toward the first support mechanism 24.

Figure 16:
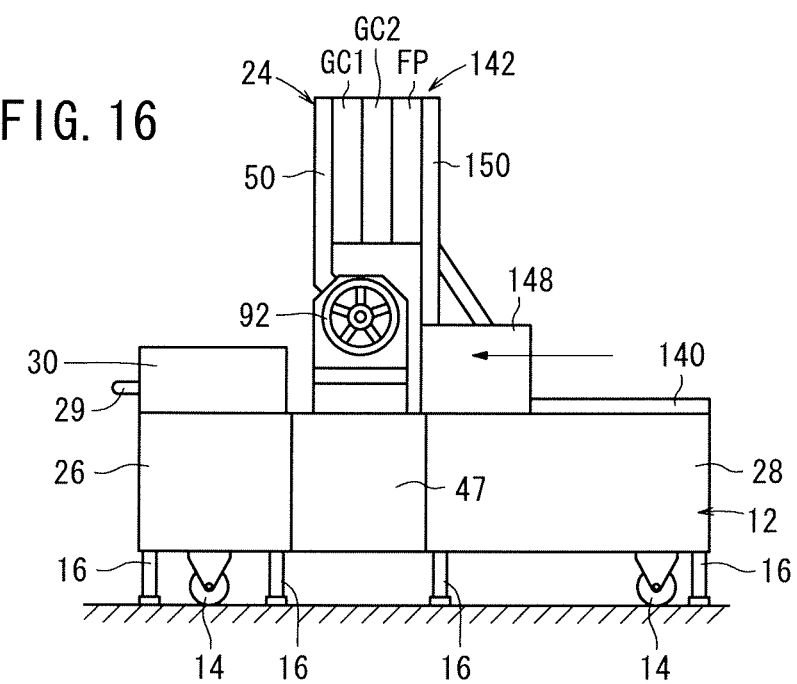
FIG. 16 is a schematic side elevational view showing the manner in which after the state shown in FIG. 15, the second support mechanism is displaced closely to the first support mechanism to bring the front panel into abutment against the assembly.

As shown in FIG. 16, the second support mechanism 142 is displaced until the front panel FP abuts against the second gear case GC2. When the front panel FP abuts against the second gear case GC2, the operator joins the second gear case GC2 and the front panel FP to each other with bolts or the like, for example. The first gear case GC1, the second gear case GC2, and the front panel FP are now stacked and assembled together into a gang head.

Figure 17:
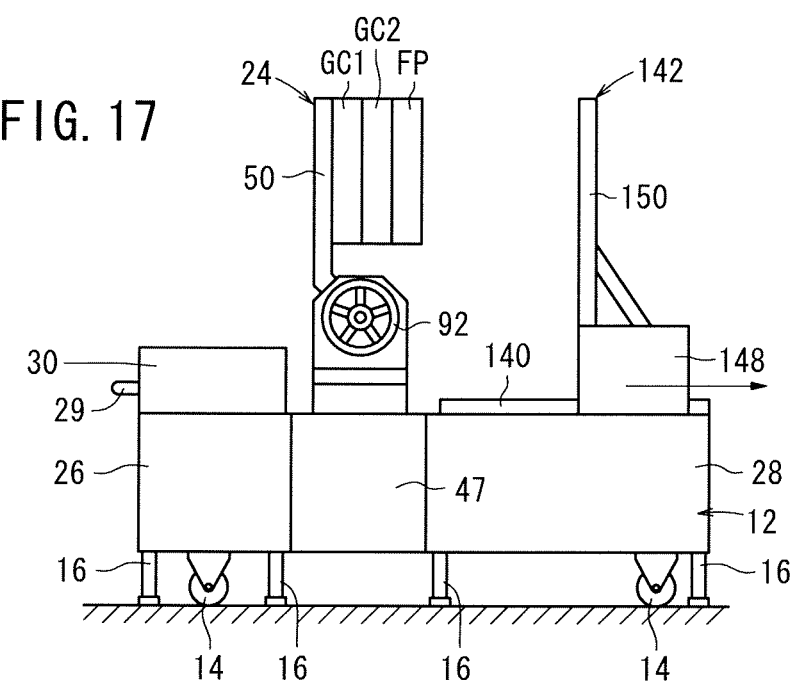
FIG. 17 is a schematic side elevational view showing the manner in which after the assembly of the above assembly and the front panel is obtained, the front panel is released from the second support mechanism, and the second support mechanism is displaced away from the first support mechanism.

Thereafter, as shown in FIG. 17, when the operator unfastens the front panel FP from the support angles 174, the gang head is supported by only the first support mechanism 24. The operator turns the first support mechanism 24 back through about 180°, and then swings the arm 50 toward the table 30 until the gang head is placed on the table 30. Thereafter, the operator unclamps the first gear case GC1 from the clamp arms 136, whereupon the gang head is released from the machine tool assembling apparatus 10.

If the above process is to be repeated, the working oil delivered into the hydraulic cylinder 42 is discharged to lower the lifting/lowering rod 44 and the first support mechanism 24.

According to the present embodiment, the machine tool assembling apparatus 10 is moved and set in position, the arm 50 of the first support mechanism 24 is swung, the first support mechanism 24 is lifted and lowered and rotated, and the second support mechanism 142 is displaced and rotated, all manually by the operator. In other words, the machine tool assembling apparatus 10 is free of any actuating mechanisms for moving itself, the first support mechanism 24, and the second support mechanism 142. Accordingly, the machine tool assembling apparatus 10 can easily be moved. Further, the machine tool assembling apparatus 10 can be operated in a place which has no access to electric power supplies.

As the machine tool assembling apparatus 10 requires no electric power supply, electric power consumption can be reduced and thus can be operated at a reduced cost. Since the machine tool assembling apparatus 10 requires no actuating mechanisms, it is simple in structure and light in weight.

The machine tool assembling apparatus 10 is capable of assembling gang heads by itself, and thus there is no need to have a plurality of working stations such as a first station for assembling the first gear case GC1 and the second gear case GC2 together, a second station for installing the front panel FP on the assembly of the first gear case GC1 and the second gear case GC2, and an inverting station. It is also not required to have a conveying means for conveying the assembly between such stations. Accordingly, an installation space for placing the machine tool assembling apparatus 10 therein or a working space in which the machine tool assembling apparatus 10 is operated is greatly reduced.

Since the machine tool assembling apparatus 10 can be operated by a few operators at most, the total number of operators required to operate the machine tool assembling apparatus 10 is much smaller than if operators are assigned to respective stations.

In addition, even if parts having different dimensions are to be placed as the first gear case GC1 and the second gear case GC2 on the table 30, they can be handled appropriately by selecting some of the insertion holes 32 in which to insert the positioning pins 34 and selecting either the first heads 36 or the second heads 38 of the positioning pins 34.

Similarly, even if a front panel FP having different dimensions is to be supported on the support angles 174, it can be handled appropriately by selecting the positions of the support angles 174 on the columnar support members 150 and selecting appropriate ones of the insertion holes 182 in which to insert the bolts or the like.

Stated otherwise, the machine tool assembling apparatus 10 according to the present embodiment can handle first gear cases GC1, second gear cases GC2, and front panels FP which are of various different dimensions.

If the machine tool assembling apparatus 10 is used as a stationary apparatus, then it may include actuating mechanisms and a sequence control circuit for automatically swinging the arm 50 of the first support mechanism 24, lifting and lowering and rotating the first support mechanism 24, and displacing and rotating the second support mechanism 142, in order to automatically sequentially perform operations as shown in FIGS. 9 through 17.

In the illustrated embodiment, the second support mechanism 142 can be displaced toward and away from the first support mechanism 24. However, the first support mechanism 24 may be displaced toward and away from the second support mechanism 142, or both the first support mechanism 24 and the second support mechanism 142 may be displaced toward and away from each other.

The second support mechanism 142 may include a swingable arm 50 as with the first support mechanism 24, and may be lifted and lowered by a lifting/lowering mechanism.

Although a certain preferred embodiment of the present invention has been shown and described in detail, it should be understood that various changes and modifications may be made therein without departing from the scope of the appended claims.

What is claimed is:

1. A machine tool assembling apparatus for assembling a machine tool by combining a plurality of parts, said machine tool assembling apparatus comprising:
   a table for placing a first part thereon;
   a first support mechanism having an arm for supporting the first part;
   a swinging mechanism for swinging the arm toward and away from the table;
   a first rotating mechanism for rotating the first support mechanism;
   a second support mechanism for supporting a second part;
   a second rotating mechanism, different from the first rotating mechanism, for rotating the second support mechanism; and
   a guide member for guiding at least one of the first support mechanism and the second support mechanism to move the first support mechanism and the second support mechanism relatively toward and away from each other;
   wherein the first support mechanism is positioned between the table and the second support mechanism, and when the first support mechanism is rotated by the first rotating mechanism, the arm faces either one of the table and the second support mechanism.

2. The machine tool assembling apparatus according to claim 1, further comprising a lifting/lowering mechanism for lifting and lowering the first support mechanism.

3. The machine tool assembling apparatus according to claim 1, further comprising a movable carriage.

4. A machine tool assembling apparatus for assembling a machine tool by combining a plurality of parts, said machine tool assembling apparatus comprising:
   a table for placing a first part thereon;
   a first support mechanism having an arm for supporting the first part;
   a swinging mechanism for swinging the arm toward and away from the table;
   a rotating mechanism for rotating the first support mechanism;
   a second support mechanism for supporting a second part; and
   a guide member for guiding at least one of the first support mechanism and the second support mechanism to move the first support mechanism and the second support mechanism relatively toward and away from each other;
   wherein the first support mechanism is positioned between the table and the second support mechanism, and when the first support mechanism is rotated by the rotating mechanism, the arm faces either one of the table and the second support mechanism;
   wherein the table has insertion holes defined therein, and the first part has recesses defined therein; and
   positioning pins are inserted into the insertion holes and are also inserted into the recesses, thereby to position and secure the first part on the table.

* * * * *